(12) United States Patent
Berdichevsky et al.

(10) Patent No.: US 7,237,444 B2
(45) Date of Patent: Jul. 3, 2007

(54) TORQUE CELL FOR DETERMINING A TORQUE LOAD ON A ROTARY MEMBER

(75) Inventors: Alexander Berdichevsky, Farmington Hills, MI (US); Vahidin Alajbegovic, Novi, MI (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 121 days.

(21) Appl. No.: 11/170,644

(22) Filed: Jun. 29, 2005

(65) Prior Publication Data

US 2007/0000336 A1 Jan. 4, 2007

(51) Int. Cl.
*G01L 3/00* (2006.01)

(52) U.S. Cl. ............ 73/862.324; 73/862.325; 73/862.328; 73/862.331; 73/862.333; 73/862.335; 73/862.337

(58) Field of Classification Search .......... 73/862.324, 73/862.325, 862.328, 862.331, 862.333, 73/862.335, 862.337
See application file for complete search history.

(56) References Cited

U.S. PATENT DOCUMENTS

| | | | |
|---|---|---|---|
| 3,965,778 A | 6/1976 | Aspers et al. | |
| 3,982,419 A | 9/1976 | Boys | |
| 4,008,773 A | 2/1977 | Wallace et al. | |
| 4,110,829 A | 8/1978 | Boys | |
| 4,446,746 A * | 5/1984 | Aoshima et al. | 73/862.324 |
| 4,448,275 A * | 5/1984 | Kitagawa et al. | 180/446 |
| 4,637,264 A | 1/1987 | Takahashi et al. | |
| 4,905,107 A * | 2/1990 | Klein | 360/75 |
| 4,907,461 A * | 3/1990 | Eto et al. | 73/862.322 |
| 4,932,270 A * | 6/1990 | Lurie et al. | 73/862.325 |
| 5,450,761 A * | 9/1995 | Zilberman et al. | 73/862.329 |
| 5,675,095 A * | 10/1997 | Ballantyne | 73/862.325 |
| 6,513,394 B1 * | 2/2003 | Gutjahr et al. | 73/862.324 |
| 6,513,395 B1 * | 2/2003 | Jones | 73/862.333 |
| 6,578,437 B1 * | 6/2003 | Moerbe | 73/862.328 |
| 6,584,835 B2 | 7/2003 | Jenniges et al. | |
| 6,679,126 B2 * | 1/2004 | Dalton et al. | 73/862.324 |
| 6,776,058 B1 * | 8/2004 | Schroeder | 73/862.333 |
| 6,837,116 B2 * | 1/2005 | Desbiolles | 73/862.335 |
| 6,912,921 B2 * | 7/2005 | Fujiwara et al. | 73/862.328 |
| 6,915,710 B2 * | 7/2005 | Nicholson | 73/862.324 |

OTHER PUBLICATIONS

"Theory of Viscosity Measurement," http://www.hanssummers.com/electronics/viscometer/mech.htm (3 pages).

* cited by examiner

*Primary Examiner*—Edward Lefkowitz
*Assistant Examiner*—Freddie Kirkland, III
(74) *Attorney, Agent, or Firm*—Harness, Dickey & Pierce, P.L.C.

(57) ABSTRACT

A torque detection system is provided for detecting torque applied to a rotary shaft. A spring element is connected to an input and output shaft. As torque is applied to the shaft system, the input shaft is rotationally offset from the output shaft and a sensing system is provided for sensing the amount of rotational offset which is then correlated to a rotational torque level.

3 Claims, 5 Drawing Sheets

TORQUE CELL FOR DETERMINING A TORQUE LOAD ON A ROTARY MEMBER

FIELD OF THE INVENTION

The present invention relates to a torque detecting apparatus for detecting the torsional torque applied to a rotating shaft member.

BACKGROUND AND SUMMARY OF THE INVENTION

In many industrial applications, it is desirable to measure the torque applied to a rotating shaft. These torque measurements can be utilized in shaft design in order to provide optimal strength and predict failure thereof. U.S. Pat. No. 4,637,264 discloses an optical torque detector in which a pair of rotary plates are utilized, each having a radial optical grid disposed so as to face one another and which are connected to a shaft member, of which the torsional torque is to be detected. The plates are separated by a predetermined spacing between their connected positions to the shaft so that a Moire fringe pattern may be created in accordance with change of a relative turning between the rotary plates caused by torsion of the shaft member. A detecting device is provided for detecting a shift of the MOIRE fringe pattern so that a torsional torque of a shaft member may be detected. This type of torque detecting device is limited to detection of torque across a unitary shaft, and requires the design of a complex Moire fringe pattern. Accordingly, it is desirable in the art to provide a less complex method of torque detection for a rotating shaft. Furthermore, it is desirable to allow for easy switching between different load ranges by replacing a flexible element to provide a wider range of torque detection.

According to one aspect of the present invention, a torque detector is provided including a torque input element, a spring element connected to the torque input element, a torque output element connected to the spring element, and a sensing system for sensing a rotational offset between the torque input element and torque output element. The spring element is designed to be replaceable with different spring elements in order to allow detection of different load ranges.

According to another aspect of the present invention, a light emitting device is provided along with a first toothed member connected to the torque input element and a second tooth member connected to the torque output element. A light sensing device is disposed on the second side of the first and second toothed members opposite the light emitting device wherein a processor is utilized for processing a signal from said light sensing device for determining an average signal level and associating said average signal level with a corresponding torque level.

According to yet another aspect of the present invention, a first magnetic encoder member is connected to the torque input element and a second magnetic encoder member is connected to the torque output element, wherein a sensing system is provided for simultaneously determining a rotational position of the first and second magnetic encoders and determining a rotational offset therebetween and associating the determined rotational offset with a corresponding torque level. In further alternative arrangements, a capacitance-based sensing system and a linear variable displacement transformer-based sensing system are also disclosed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
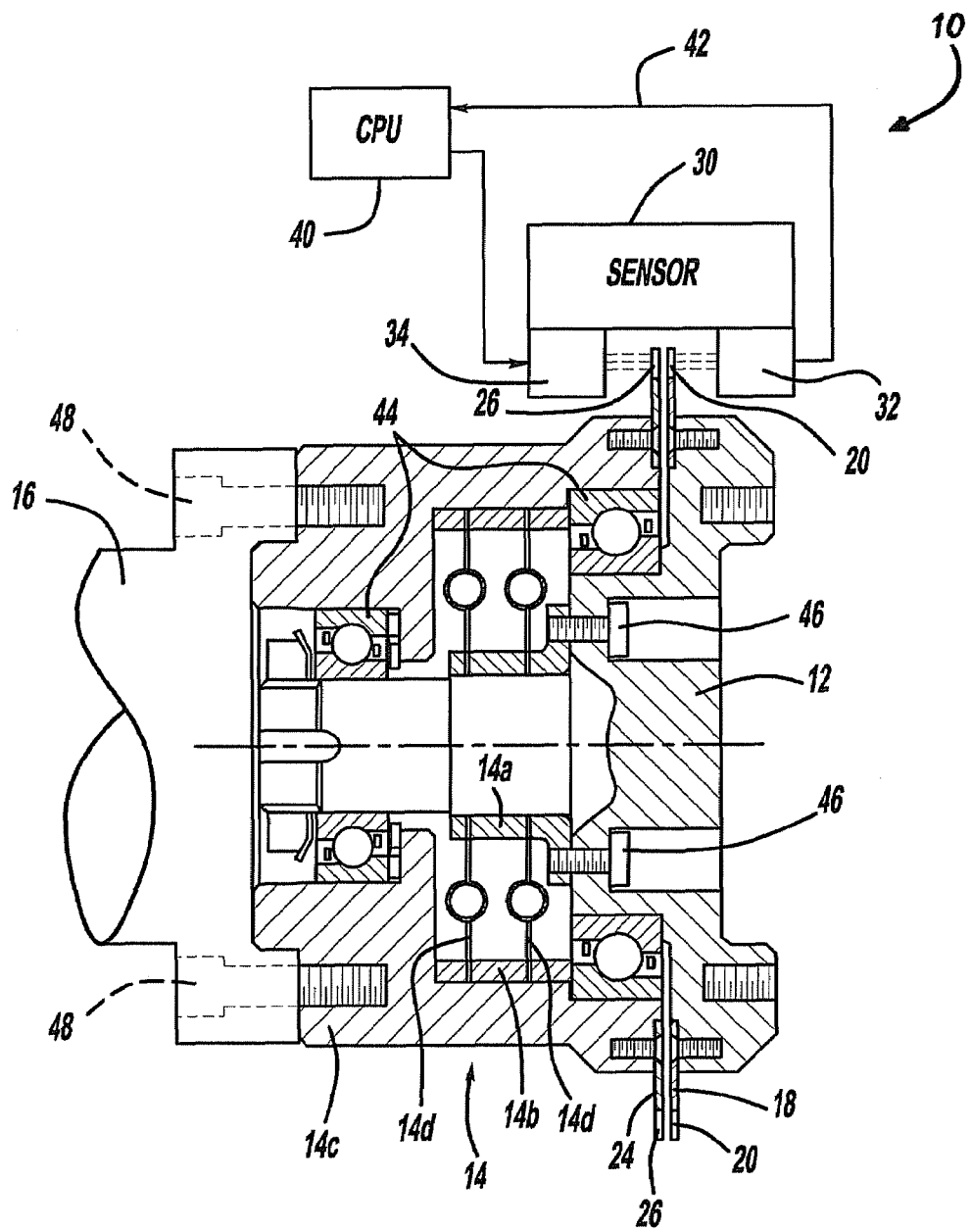
FIG. 1 is a schematic view of a torque cell utilizing an optical system for measuring rotational torque according to the principles of the present invention.
Figure 2:
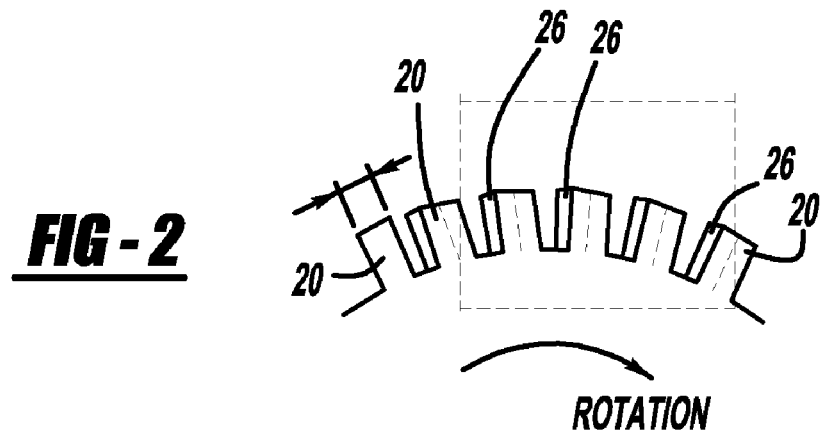
FIG. 2 illustrates the overlapping plates of the optical torque detection system according to the principles of the present invention.
Figure 3:
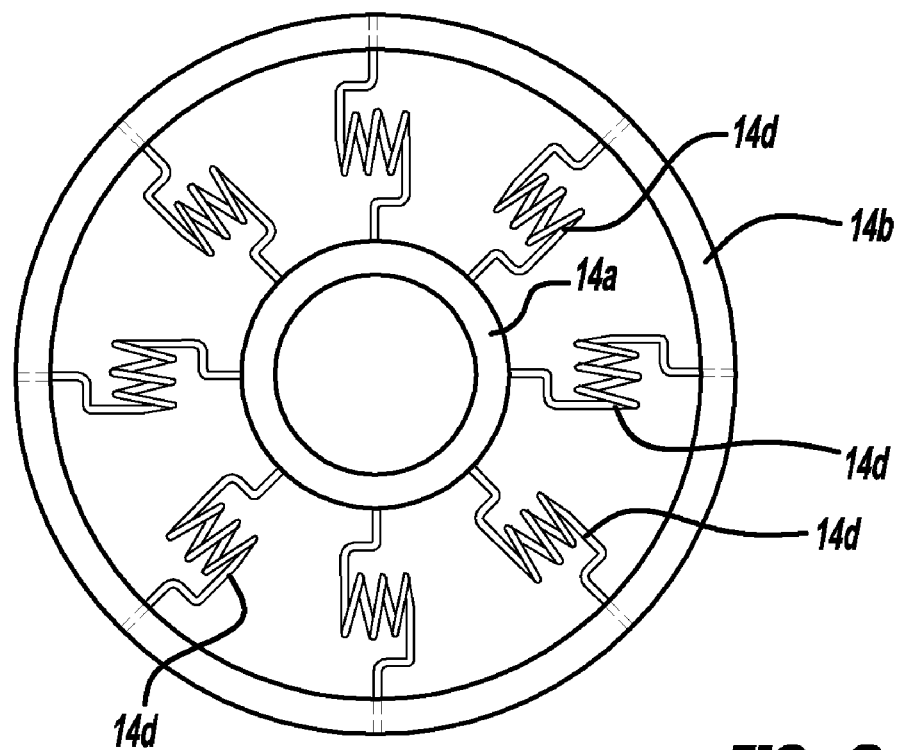
FIG. 3 is a plan view of a portion of the spring element.

With reference to FIGS. 1-3, a torque cell 10 for measuring the torsional torque applied to a rotating shaft, will now be described. The torque cell 10 includes an input shaft or drive element 12 which is connected to a spring element 14. The spring element 14 is also connected to an output shaft or driven element 16. The input shaft 12 is directly or indirectly connected to a source of motive power, while the output shaft 16 is connected to a load or other element that provides resistance to rotation of the shaft 16. The input shaft 12 is provided with a disk 18 fixably mounted thereto and including a plurality of evenly spaced teeth 20 on the perimeter surface thereof. Similarly, the output shaft 16 includes a disk 24 fixably mounted thereto and including a plurality of equally spaced teeth 26 on the perimeter thereof. The disks 18, 24 oppose one another so that the teeth 20, 26 overlap each other in a predetermined relationship. An optical sensing device 30 is provided including a light source 32 and a light detecting sensor 34 each disposed on opposite sides of the disks 18, 24. The light source 32 is activated to shine a beam of light at the overlapping teeth 20, 26 and gaps provided on disks 18, 24.

Initially, the teeth 20, 26 of the disks 18, 24 have a predetermined overlap that may mean that the teeth are aligned with one another with no torque being applied, or can be provided with a predetermined offset. When torque is applied across the spring element 14, the spring element 14, which can be placed in compression or tension, will allow the input shaft 12 to be rotationally offset relative to the output shaft 16, thus, causing a change in the overlap offset of the teeth 20, 26 of the disks 18, 24. With the spring constant (k) of the spring element 14 being known, the rotational offset (α) can be measured and directly correlated to a torque value being applied to the shaft elements via the equation k times α. Different spring elements with different spring constants can be utilized to provide detection of torque across different load ranges. The spring element as shown includes an inner hub portion 14a connected to the input shaft 12 via fasteners 46. An outer hub portion 14b is disposed within a housing 14c. Housing 14c is connected to the output shaft 16 by bolt 48. A plurality of springs 14d extend radially between inner hub portion 14a and outer hub portion 14b, as best shown in FIG. 3. The springs 14d combine to provide the spring element with a known spring constant K. A pair of bearings 44 are provided between input shaft 12 and housing 14c of spring element 14 to allow relative rotation therebetween albeit constrained by springs 14d. The above described spring element construction is merely for exemplary purposes and it should be understood that many other configurations could be used.

Figure 4:
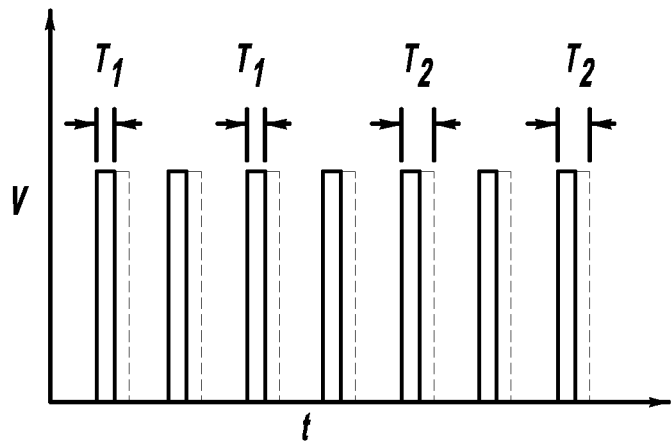
FIG. 4 is a graphical illustration of the optical torque detection system according to the principles of the present invention.

With reference to FIG. 2, the rotational offset (α) of the teeth 20, 26 relative to one another is illustrated. It should be understood, when the teeth 20, 26 of the disks 18, 24 are aligned in nearly perfect overlap, the gap therebetween is the largest. As the teeth 20, 26 become offset, the gaps therebetween are narrowed. In FIG. 4, a graphical illustration of the voltage signal received from the light sensor 34 is provided in which the signal is generally represented by a series of stepped voltage levels which merely indicate the receipt of light by the sensor 34 with intervals therebetween which indicate the non-receipt of light. As illustrated in FIG. 4, the thickness of the bars T1 are indicative of the voltage signal received from the light sensor when the teeth 20, 26 of disks 18, 24 are offset, while the thickness T2, illustrated in phantom lines, illustrate the light sensor voltage signal received when the teeth 20, 26 of disks 18, 24 are aligned so as to overlap without offset. Accordingly, with the system of the present invention, the system includes a processor unit 40 which receives the light sensor signal 42 from light sensor 34. The processor unit 40 processes the signal to determine an average thickness of the time interval bar and correlates the detected average thickness with a torque level using the known spring constant (k) of the spring element 14.

Figure 5:
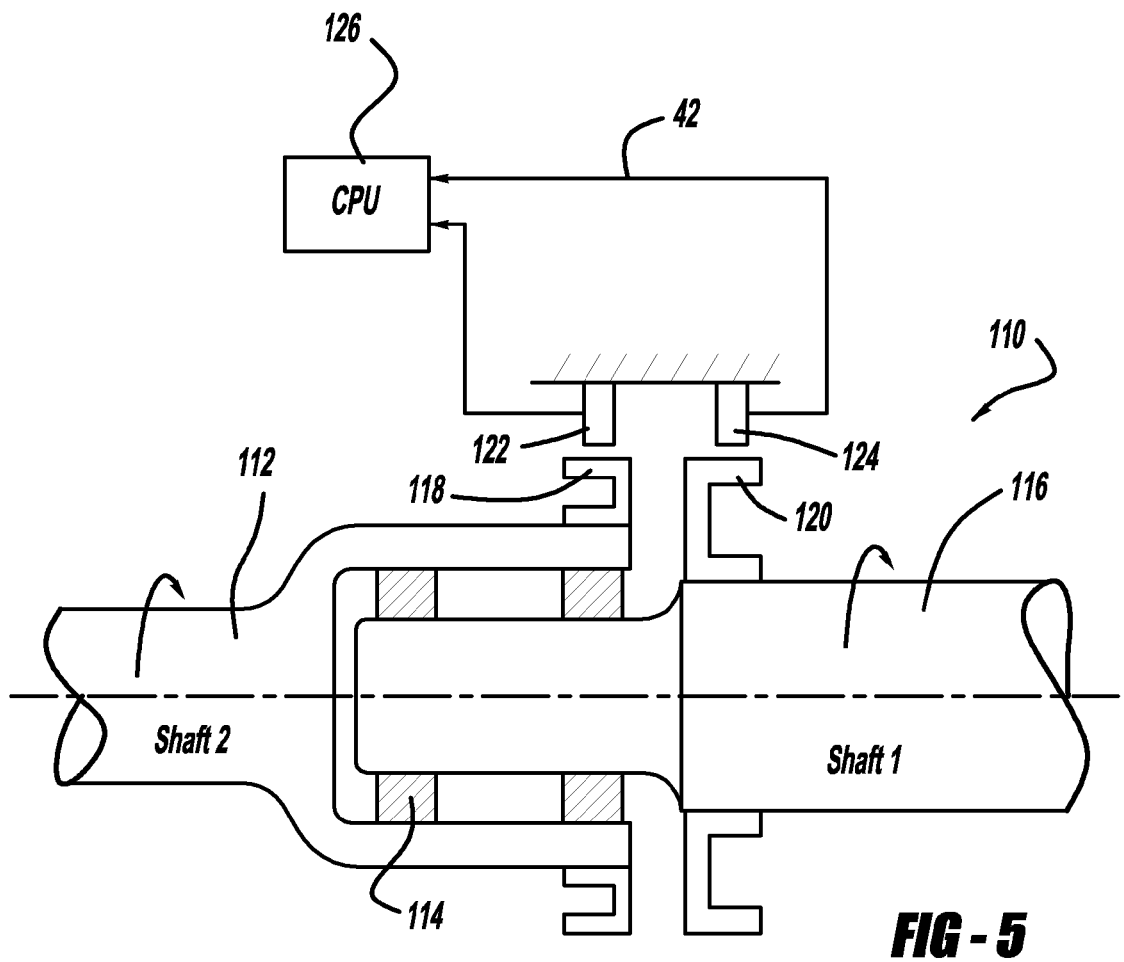
FIG. 5 is a schematic view of a torque detection system utilizing magnetic encoders according to the principles of the present invention.

With reference to FIG. 5, an alternative torque cell system is provided for detecting the torque applied to a rotational shaft. The system 110 includes an input shaft 112 connected to a spring element 114 which is connected to an output shaft 116. The input shaft 112 and output shaft 116 are each provided with a magnetic encoder ring 118, 120, respectively, fixably mounted thereto. Magnetic encoder rings of this type are commonly used in automotive engines for accurately determining the rotational position of a rotating cam shaft or crank shaft for providing precise control of the engine air, fuel, and spark timing. Encoder sensor elements 122, 124 are provided for simultaneously detecting the rotational position of the encoder rings 118, 120. A processor unit 126 processes the signals from the encoder sensors 122, 124, determines a rotational offset between the magnetic encoder rings 118, 120 and correlates the determined rotational offset to a torque level based upon the known spring constant (k) of the spring element 114.

Figure 6A:
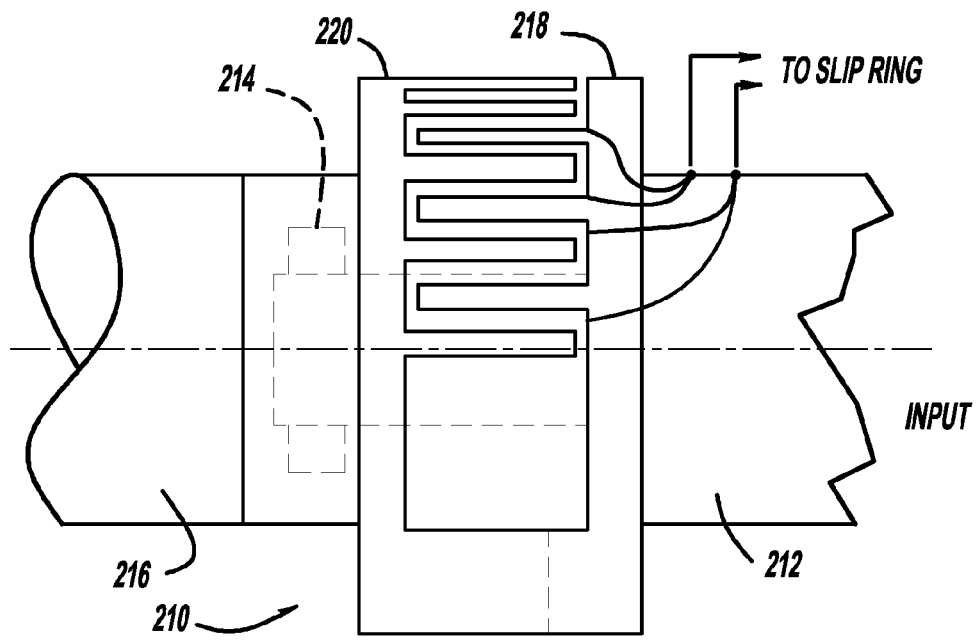
FIGS. 6A-6C are schematic views of a torque detection system utilizing a capacitance-based torque detection system according to the principles of the present invention.
Figure 6B:
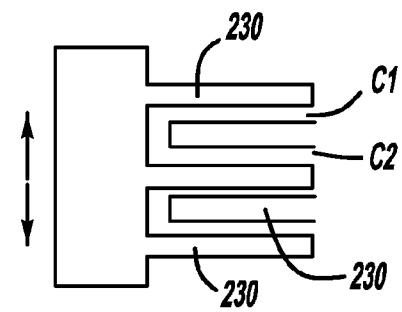
Figure 6C:
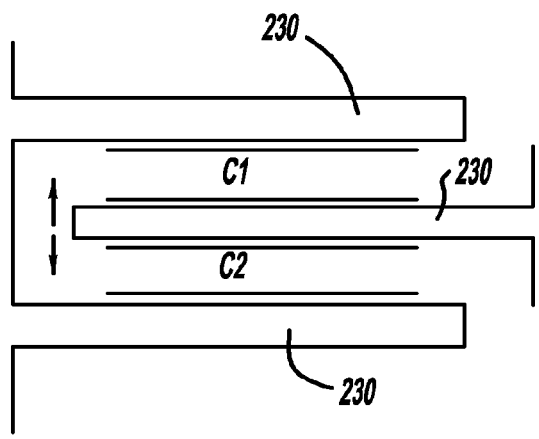

With reference to FIGS. 6A-6C, an alternative torque cell 210 is provided for detecting torque applied to a rotating shaft. The system 210 includes an input shaft 212 connected to a spring element 214 which is, in turn, connected to an output shaft 216 so as to allow relative rotation between the input and output shafts 212, 216. A first capacitance plate 218 is fixedly attached to the input shaft 212 and a second capacitance plate 220 is fixedly attached to the output shaft 216. The first and second capacitance plates 218, 220 are provided with fingers 230 such that angular displacement of the intermeshing plates as shown in FIGS. 6B and 6C create a capacitance differential which combine to provide a varying capacitance-based signal as the plate 218 is rotationally offset relative to the capacitance plate 220. The varying signal is transmitted by a transmitter or can be transmitted via a slip ring device, as is known in the art, to a processor unit 224 which correlates a torque level to the measured capacitance-based signal.

Figure 7:
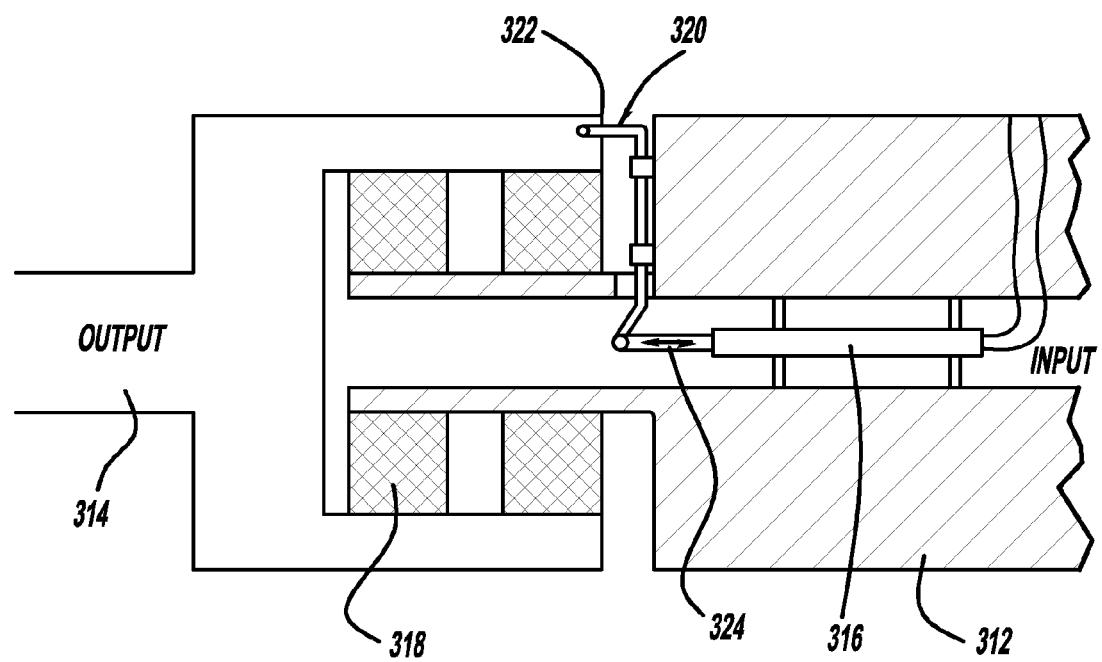
FIG. 7 is a schematic view of a torque detection system utilizing a linear variable displacement transformer-based torque detection system.

As an alternative, as shown in FIG. 7, the rotational offset of the input and output shafts can be detected by a linear variable displacement transformer (LVDT) 316. In FIG. 7, a spring element 318 is connected between input shaft 312 and output shaft 314. A spring biased linkage system 320 is engaged with a cammed face 322 on the output shaft 314 so as to translate the relative angular displacement between the input shaft 312 and output shaft 314 into a linear movement of a rod 324 of the LVDT 316. A signal from the LVDT can be transmitted via a slip ring or transmitter to a processor unit which correlates the measured displacement with a torque level based upon the known spring constant of spring element 318.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque detector, comprising:
   a torque input element;
   a spring element connected to said torque input element;
   a torque output element connected to said spring element;
   a first toothed member connected to said torque input element;
   a second toothed member connected to said torque output element;
   a light emitting device disposed on one side of said first and second toothed members;
   a light sensing device disposed on a second side of said first and second toothed members opposite said light emitting device; and
   means for processing a signal from said light sensing device for determining an average signal level and associating said average signal level with a corresponding torque level.

2. The torque detector according to claim 1, wherein said light emitting device is a stroboscopic light.

3. A torque detector, comprising:
   a torque input element;
   a spring element connected to said torque input element;
   a torque output element connected to said spring element;
   a first member connected to said torque input element;
   a second member connected to said torque output element;
   capacitance-based sensing means for determining a rotational offset between said first and second members; and
   processing means for associating the determined rotational offset with a corresponding torque level.

* * * * *